(No Model.)

B. F. ESHELMAN.
CARPET FASTENER.

No. 322,095. Patented July 14, 1885.

WITNESSES
T. Walter Fowler.
Daniel Clark.

INVENTOR
Benj. F. Eshelman
per N. H. Evans & Co.
Attorneys

UNITED STATES PATENT OFFICE.

BENJAMIN F. ESHELMAN, OF HARLAN, IOWA.

CARPET-FASTENER.

SPECIFICATION forming part of Letters Patent No. 322,095, dated July 14, 1885.

Application filed May 18, 1885. (No model.)

*To all whom it may concern:*

Be it known that I, BENJAMIN F. ESHELMAN, a citizen of the United States, and residing at Harlan, in the county of Shelby and State of Iowa, have invented a new and useful Improved Carpet-Fastener, of which the following is so clear and exact a description as to enable others skilled in the art to which my invention appertains to make and use the same.

The object of my invention is, first, to provide a carpet-fastener which shall firmly hold the carpet in position on a floor, and at the same time prevent its raveling or fraying at the edges; second, to provide a carpet-fastenener that can be readily and easily withdrawn when it is desired to take the carpet up; thirdly, to provide a fastener the head of which shall not be liable to break off while the fastener is being driven home or while it is being withdrawn.

With these objects in view I construct a fastener which accomplishes the first-mentioned object by providing my fastener with an elongated head, which extends at an angle to the shank and slanting toward the point of the latter.

I accomplish the second-named object by providing the elongated head on one side only of the shank, thus leaving the shank exposed on the other side, which permits the gripping of the same with a claw, and thus makes its removal an easy matter.

The third object is accomplished by making the head integral with the shank, and providing the fastener at the fork, at the junction of the upper end of the shank and the upper edge of the head, with a drop of solder; or, if cast at a single operation, I provide a slight depression in the mold, which allows a small deposit of metal at that point.

I will now proceed to describe a preferred form of fastener which I have adopted in carrying out my invention, reference being had to the accompanying drawings, in which—

Figure 1:
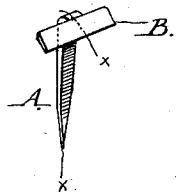
Figure 2:
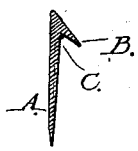
Figure 3:
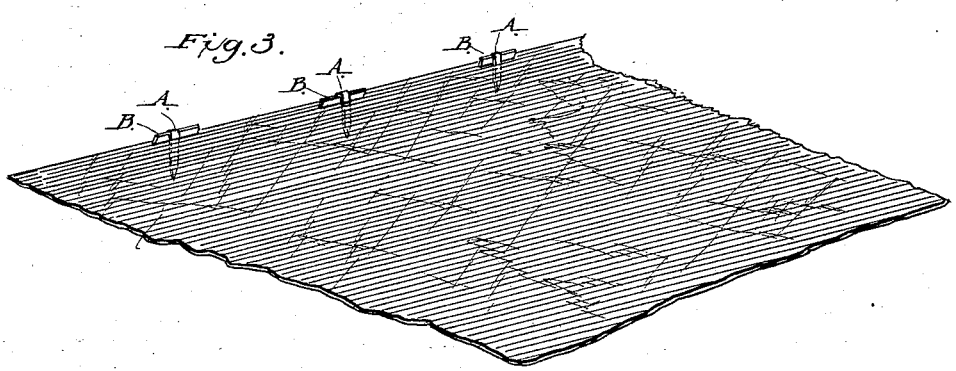

Figure 1 is a perspective of my improved fastener. Fig. 2 is a vertical section of Fig. 1 on the line *x x.* Fig. 3 shows a piece of carpet fastened by my improved fastener.

A represents the shank of my improved fastener; B, the elongated head, and C the strengthening-drop at the fork of the fastener.

It will be observed that the head slants toward the point of the shank. This slanting enables the operator to partially bind the carpet or other fabric with the elongated head of the tack by driving the latter into the carpet or fabric with that side upon which the head is secured toward the edge of the carpet.

The distance between the fasteners when used to fasten a carpet or mosquito-net should be determined by the strength of the fabric and the amount of strain which it will probably have to withstand.

By driving the fastener into the carpet with the side to which the head is secured next to the wall, it will be an easy matter to withdraw the fastener by simply inserting a suitable claw for that purpose.

By providing the fork with a strengthening drop or deposit it will be practically impossible to break the head off from the shank, as the shank or the head would probably break first; hence liability of breaking and consequent loss of fasteners is comparatively slight, if there be any at all.

It is evident that the binding-edge of the head of the tack may be serrated, if desired.

Having thus described my invention, what I claim as new, and desire to secure by Letters Patent, is—

A carpet-fastener having a shank and a head elongated at right angles to the line of the shank and slanting toward the point thereof, substantially and for the purpose described.

BENJAMIN F. ESHELMAN.

Witnesses:
S. H. WATTERS,
W. W. WYLAND.